United States Patent
Horvitz et al.

(10) Patent No.: US 9,742,485 B2
(45) Date of Patent: *Aug. 22, 2017

(54) PROVIDING NETWORK CONNECTIVITY AND ACCESS TO CONTENT AND COMMUNICATIONS VIA MOVING OBJECTS

(71) Applicant: Microsoft Technology Licensing, LLC, Redmond, WA (US)

(72) Inventors: Eric Horvitz, Kirkland, WA (US); Ashish Kapoor, Kirkland, WA (US); Jie Liu, Medina, WA (US); Ranveer Chandra, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/339,625

(22) Filed: Oct. 31, 2016

(65) Prior Publication Data

US 2017/0047984 A1    Feb. 16, 2017

Related U.S. Application Data

(63) Continuation of application No. 15/065,405, filed on Mar. 9, 2016, now Pat. No. 9,515,721, which is a
(Continued)

(51) Int. Cl.
*H04B 7/185* (2006.01)
*H04W 72/04* (2009.01)
(Continued)

(52) U.S. Cl.
CPC ..... *H04B 7/18506* (2013.01); *H04B 7/18504* (2013.01); *H04W 4/06* (2013.01);
(Continued)

(58) Field of Classification Search
CPC .......... H04L 2012/5608; H04W 84/12; H04W 88/08; H04W 80/04; H04W 88/06;
(Continued)

(56) References Cited

U.S. PATENT DOCUMENTS

| | | |
|---|---|---|
| 5,448,623 A | 9/1995 | Wiedeman et al. |
| 6,104,926 A | 8/2000 | Hogg et al. |

(Continued)

FOREIGN PATENT DOCUMENTS

| | | |
|---|---|---|
| EP | 1085679 A2 | 3/2001 |
| WO | 0120814 | 3/2001 |

OTHER PUBLICATIONS

"Notice of Allowance Issued in U.S. Appl. No. 15/065,405", Mailed Date: Sep. 19, 2016, 2 Pages.
(Continued)

*Primary Examiner* — Brenda H Pham
(74) *Attorney, Agent, or Firm* — International IP Law Group, PLLC

(57) ABSTRACT

Various techniques for providing network connectivity are described herein. In one example, a moving object includes an uplink device of the moving object to connect the moving object to a publicly available computer network. The moving object also includes a downlink device of the moving object to be communicatively coupled to a remote device at a specific segment along a route of the moving object. The remote device is to provide data received via the downlink device to a user. The moving object also further includes a cache store communicatively coupled to the uplink device and the downlink device. Implementations include the use of commercial airplanes for providing connectivity via intermittent access and refreshing of a cache store that makes content available to end users.

18 Claims, 10 Drawing Sheets

Related U.S. Application Data continuation of application No. 14/486,235, filed on Sep. 15, 2014, now Pat. No. 9,325,407.

(51) Int. Cl.

| | | |
|---|---|---|
| *H04W 36/00* | (2009.01) | |
| *H04W 4/06* | (2009.01) | |
| *H04W 40/24* | (2009.01) | |
| *H04W 36/08* | (2009.01) | |
| *H04L 29/08* | (2006.01) | |
| *H04W 84/04* | (2009.01) | |
| *H04W 80/04* | (2009.01) | |

(52) U.S. Cl.
CPC .......... *H04W 36/00* (2013.01); *H04W 36/08* (2013.01); *H04W 40/248* (2013.01); *H04W 72/042* (2013.01); *H04W 72/0406* (2013.01); *H04W 72/0413* (2013.01); *H04L 67/12* (2013.01); *H04W 80/04* (2013.01); *H04W 84/045* (2013.01)

(58) Field of Classification Search
CPC .............. H04W 84/18; H04B 7/18582; H04B 7/18584; H04B 7/18508; H04B 7/18515; H04B 7/18576
USPC ....................... 370/310.2, 316, 328, 331, 338
See application file for complete search history.

(56) References Cited

U.S. PATENT DOCUMENTS

| | | | |
|---|---|---|---|
| 6,285,878 | B1 | 9/2001 | Lai |
| 6,324,398 | B1 | 11/2001 | Lanzerotti et al. |
| 6,636,734 | B1 | 10/2003 | Berger et al. |
| 6,781,968 | B1 | 8/2004 | Colella et al. |
| 6,868,314 | B1 | 3/2005 | Frink |
| 7,652,625 | B2 | 1/2010 | Small |
| 7,715,838 | B2 | 5/2010 | Swensen et al. |
| 8,179,797 | B2 | 5/2012 | Chandra et al. |
| 8,473,989 | B2 | 6/2013 | Bahl et al. |
| 9,325,407 | B2 * | 4/2016 | Horvitz .............. H04B 7/18504 |
| 9,515,721 | B2 * | 12/2016 | Horvitz .............. H04B 7/18504 |
| 2004/0198346 | A1 | 10/2004 | Swensen et al. |
| 2005/0108374 | A1 * | 5/2005 | Pierzga .............. H04B 7/18504 709/223 |
| 2009/0252102 | A1 | 10/2009 | Seidel et al. |
| 2010/0304678 | A1 | 12/2010 | Chandraet et al. |
| 2013/0303218 | A1 | 11/2013 | Teller et al. |
| 2013/0324070 | A1 | 12/2013 | Bennett et al. |
| 2016/0101855 | A1 | 4/2016 | Stefani |

OTHER PUBLICATIONS

"International Preliminary Report on Patentability Issued in PCT Application No. PCT/US2015/049269", Mailed Date: Dec. 12, 2016, 7 Pages.

Author Unknown, "Connecting the World from the Sky", Published on: Mar. 29, 2014, 11 pages. Available at: https://fbcdn-dragon-a.akamaihd.net/hphotos-ak-ash3/t39.2365-6/851574__611544752265540_1262758947_n.pdf.

Author Unknown, "Delay Tolerant Networking", Retrieved on: Apr. 23, 2014, 2 pages. Available at: http://delaytolerantnetworking.com/.

Author Unknown, "How Loon Works", Published on: Aug. 23, 2013, 6 pages. Available at: http://www.google.co.in/loon/how/#tab=navigation.

Author Unknown, "Remote troops closer to having high-speed wireless networks mounted on UAVs", Published on: Apr. 8, 2014, 2 pages Available at: http://phys.org/news/2014-04-remote-troops-closer-high-speed-wireless.html.

McHenry, et al., "Dynamic Spectrum Access Radio Performance for UAS ISR missions", In the Military Communications Conference, Oct. 31, 2010, 6 pages.

Richards, et al., "New Air Traffic Surveillance Technology", In Boeing Aero Quarterly, Quarter 2, Retrieved on: Apr. 23, 2014, 8 pages.

International Search Report, for PCT application No. PCT/US2015/049269, dated Dec. 3, 2015, 13 pages.

Written Opinion of the International Preliminary Examining Authority for PCT Application No. PCT/US2015/049269, Mailed Aug. 29, 2016, 7 pages.

Non-Final Office Action Issued for U.S. Appl. No. 15/065,405, mailed date: Apr. 29, 2016, 12 pages.

Notice of Allowance Issued for U.S. Appl. No. 15/065,405, mailed date: Aug. 24, 2016, 5 pages.

Notice of Allowance Issued for U.S. Appl. No. 14/486,235, mailed date: Jan. 7, 2016, 19 pages.

* cited by examiner

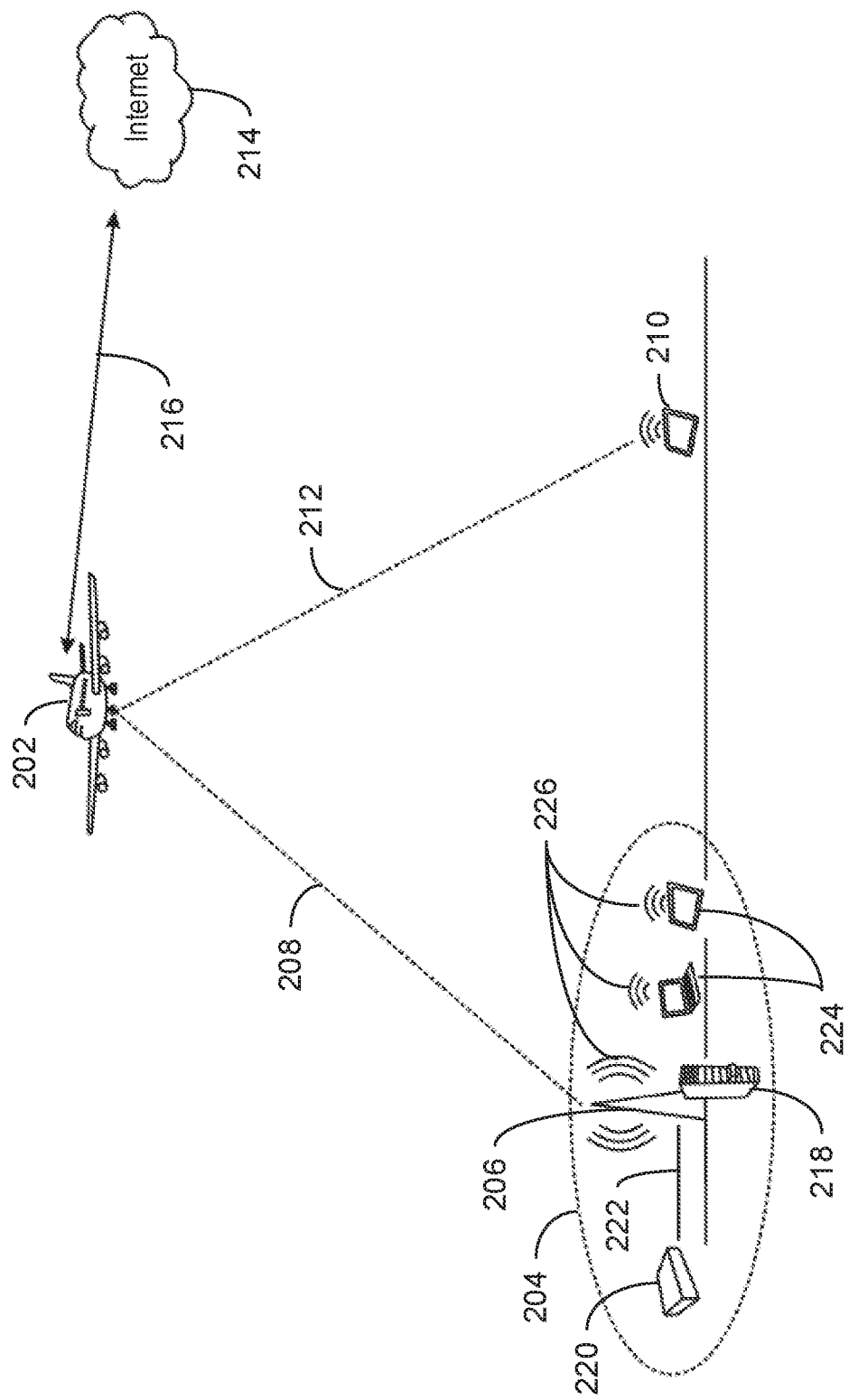

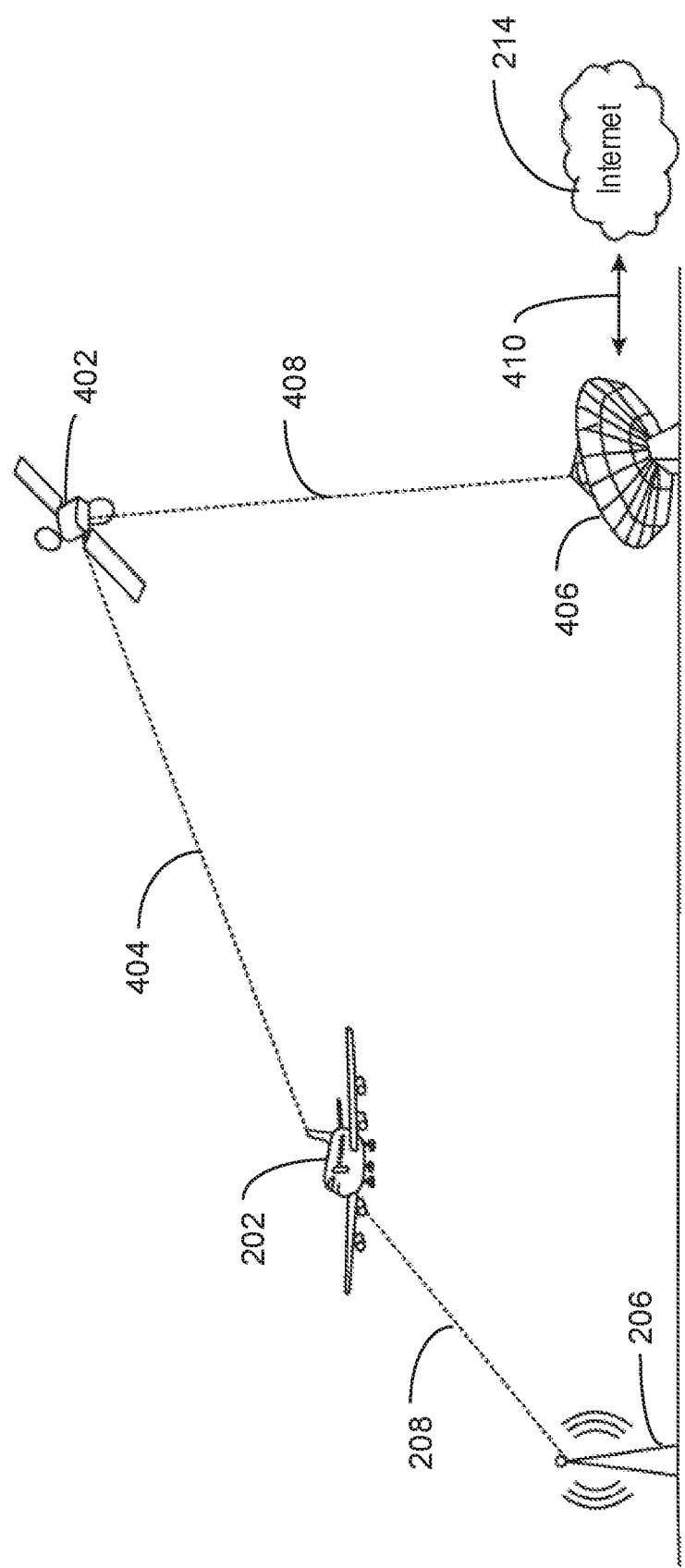

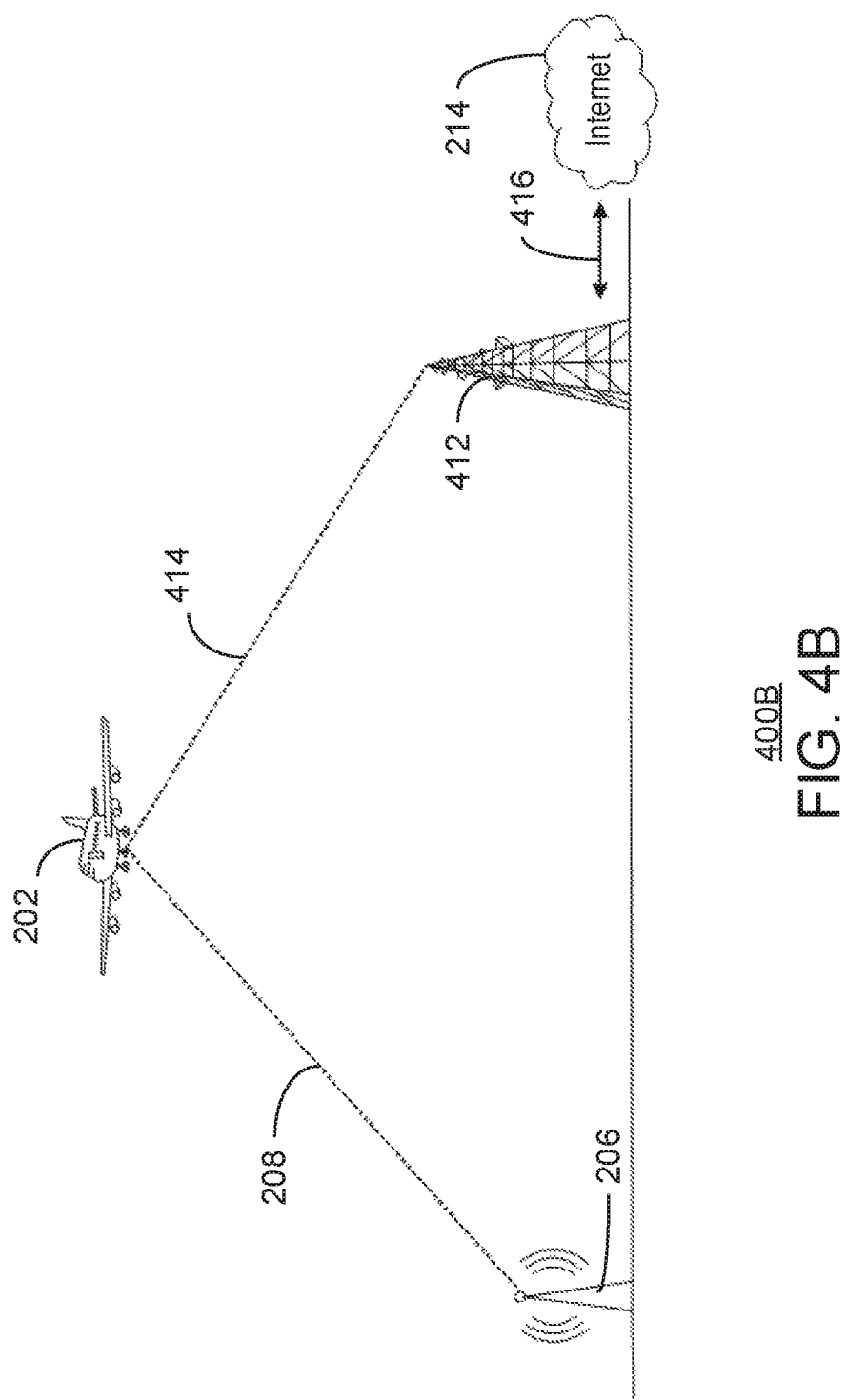

400C

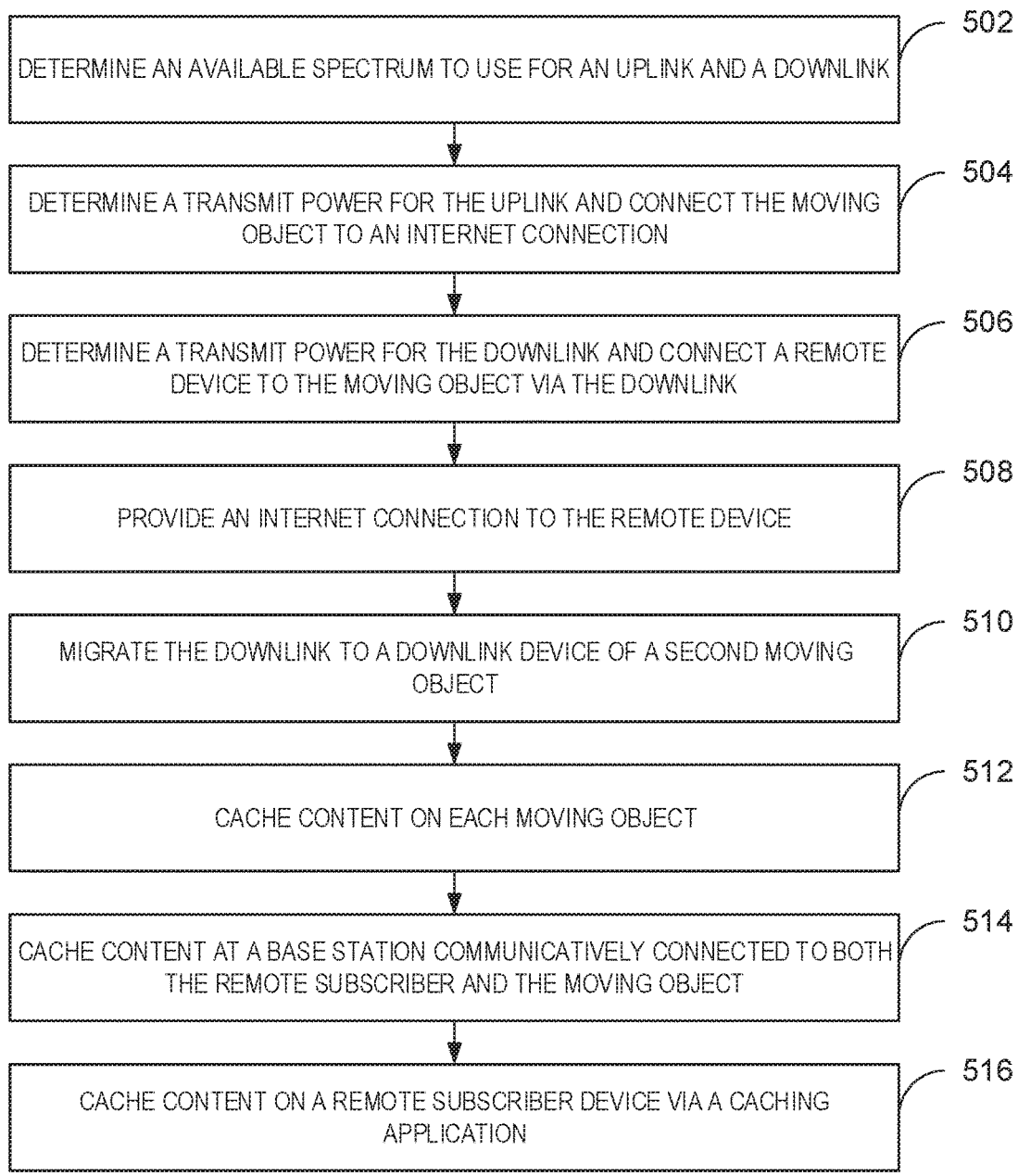

600

PROVIDING NETWORK CONNECTIVITY AND ACCESS TO CONTENT AND COMMUNICATIONS VIA MOVING OBJECTS

CROSS-REFERENCE TO RELATED APPLICATIONS

This application is a continuation application of U.S. patent application Ser. No. 15/065,405, filed on Mar. 9, 2016, titled "Providing Network Connectivity and Access to Content and Communications via Moving Objects," which is a continuation application of U.S. patent application Ser. No. 14/486,235, filed on Sep. 15, 2014, now U.S. Pat. No. 9,325,407, issued Apr. 26, 2016, (the entire contents of which are hereby incorporated by reference as though fully set forth herein).

BACKGROUND

A variety of Internet connectivity solutions exist such as wired cable, DSL, fiber optic, and wireless solutions such as 3G/4G LTE and Wi-Fi. Yet, some two thirds of the total global population lies in remote areas that are still not connected to the Internet.

SUMMARY

The following presents a simplified summary of the innovation in order to provide a basic understanding of some aspects described herein. This summary is not an extensive overview of the claimed subject matter. It is intended to neither identify key elements of the claimed subject matter nor delineate the scope of the claimed subject matter. Its sole purpose is to present some concepts of the claimed subject matter in a simplified form as a prelude to the more detailed description that is presented later.

An implementation provides a moving object that provides network connectivity. The moving object includes an uplink device of the moving object to connect the moving object to a publicly available computer network. The moving object also includes a downlink device of the moving object to be communicatively coupled to a remote device at a specific segment along a route of the moving object. The remote device is to provide data received via the downlink device to a user. The moving object further includes a cache store communicatively coupled to the uplink device and the downlink device.

Another implementation provides a method for providing network connectivity via moving objects. The method includes routing data to and from a network via a first uplink device on a first moving object. The method also includes routing data to and from a remote device via a first downlink device on the first moving object. The method further includes establishing a handoff connection between the first moving object and a second moving object. The method also further includes establishing a downlink between the remote device and a second downlink device of the second moving object. The method also includes migrating the routing of data to and from the remote device to the second downlink device and a second uplink device on the second moving object from the first downlink device via the handoff connection.

Another implementation provides one or more computer-readable storage media for providing network connectivity via moving objects. The one or more computer-readable storage media include a plurality of instructions that, when executed by a processor, cause the processor to determine an available spectrum via dynamic spectrum access. The plurality of instructions also cause the processor to establish a downlink to a remote device via a downlink device of a moving object using the available spectrum. The plurality of instructions further cause the processor to establish an uplink to a publicly available network via an uplink device of the moving object using a different portion of spectrum. The plurality of instructions also further cause the processor to send and receive data to and from a remote device. The data is to be relayed to and from the network via the uplink device.

The following description and the annexed drawings set forth in detail certain illustrative aspects of the claimed subject matter. These aspects are indicative, however, of a few of the various ways in which the principles of the innovation may be employed and the claimed subject matter is intended to include all such aspects and their equivalents. Other advantages and novel features of the claimed subject matter will become apparent from the following detailed description of the innovation when considered in conjunction with the drawings.

BRIEF DESCRIPTION OF THE DRAWINGS

FIG. 2A is a diagram of an example airplane providing large-scale Internet connectivity, according to the implementations described herein;

FIG. 4A is a diagram of an example uplink using a satellite;

FIG. 4B is a diagram of an example uplink using a direct relay;

FIG. 5 is a detailed process flow diagram of an example method for providing Internet connectivity via aircraft;

DETAILED DESCRIPTION

Figure 1:
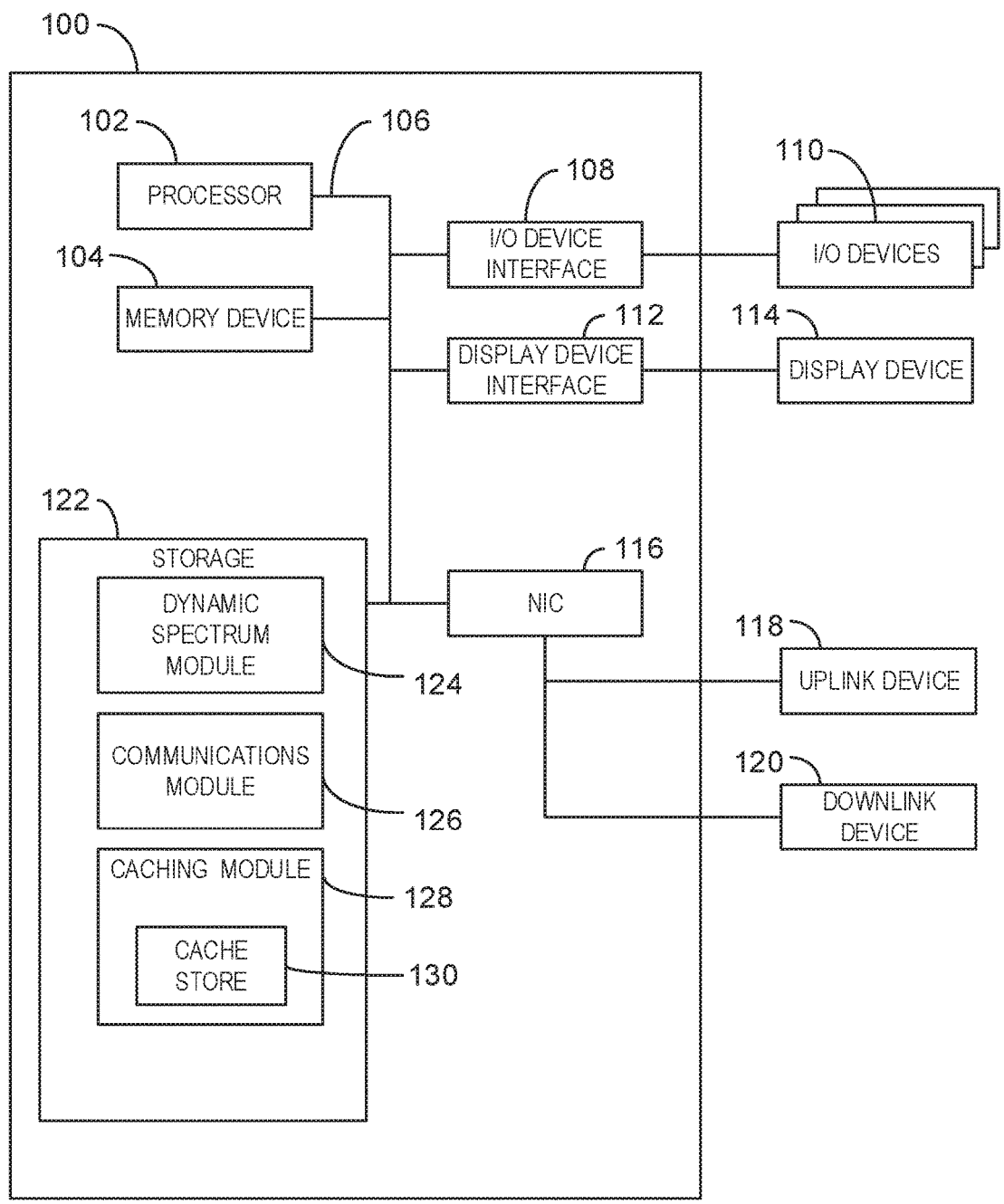
FIG. 1 is a block diagram of an example of a computing system for providing large-scale Internet connectivity.

As a preliminary matter, some of the Figures describe concepts in the context of one or more structural components, variously referred to as functionality, modules, features, elements, or the like. The various components shown in the Figures can be implemented in any manner, such as software, hardware, firmware, or combinations thereof. In some implementations, various components reflect the use of corresponding components in an actual implementation. In other implementations, any single component illustrated in the Figures may be implemented by a number of actual components. The depiction of any two or more separate components in the Figures may reflect different functions performed by a single actual component. FIG. 1, discussed below, provides details regarding one system that may be used to implement the functions shown in the Figures.

Other Figures describe the concepts in flowchart form. In this form, certain operations are described as constituting distinct blocks performed in a certain order. Such implementations are exemplary and non-limiting. Certain blocks described herein can be grouped together and performed in a single operation, certain blocks can be broken apart into multiple component blocks, and certain blocks can be performed in an order that differs from that which is illustrated herein, including a parallel manner of performing the blocks. The blocks shown in the flowcharts can be implemented by software, hardware, firmware, manual processing, or the like. As used herein, hardware may include computer systems, discrete logic components, such as application specific integrated circuits (ASICs), or the like.

As to terminology, the phrase "configured to" encompasses any way that any kind of functionality can be constructed to perform an identified operation. The functionality can be configured to perform an operation using, for instance, software, hardware, firmware, or the like. The term, "logic" encompasses any functionality for performing a task. For instance, each operation illustrated in the flowcharts corresponds to logic for performing that operation. An operation can be performed using, software, hardware, firmware, or the like. The terms, "component," "system," and the like may refer to computer-related entities, hardware, and software in execution, firmware, or combination thereof. A component may be a process running on a processor, an object, an executable, a program, a function, a subroutine, a computer, or a combination of software and hardware. The term, "processor," may refer to a hardware component, such as a processing unit of a computer system.

Furthermore, the claimed subject matter may be implemented as a method, apparatus, or article of manufacture using standard programming and engineering techniques to produce software, firmware, hardware, or any combination thereof to control a computing device to implement the disclosed subject matter. The term, "article of manufacture," as used herein is intended to encompass a computer program accessible from any computer-readable storage device or media. Computer-readable storage media can include, but are not limited to, magnetic storage devices, e.g., hard disk, floppy disk, magnetic strips, optical disk, compact disk (CD), digital versatile disk (DVD), smart cards, flash memory devices, among others. Computer-readable storage media, as used herein, do not include propagating signals. In contrast, computer-readable media, i.e., not storage media, may include communication media such as transmission media for wireless signals and the like.

As discussed above, about two thirds of the human population currently lacks Internet access. A major obstacle in providing Internet to the majority of the world is the cost of setting up a reliable infrastructure in remote communities. The traditional method of extending service by setting up communication towers, laying cables, and building electronic hubs is cumbersome and fraught with financial and political challenges.

Aircraft currently use very high frequency (VHF) to transmit flight information to traffic control towers. Automatic dependent surveillance-broadcast (ADS-B) is currently being used as a technology for tracking aircraft and has been selected as part of the Next Generation Air Transportation System (NextGen). Commercial airplanes today also offer Internet connectivity to onboard passengers via satellite services.

According to implementations described herein, a wireless network may be formed for large-scale computer network connectivity using existing moving objects. For example, a moving object can include vehicles such as motor vehicles, watercraft, spacecraft and/or aircraft. In some examples, an aircraft can be an airplane. As used herein, a computer network refers to a global system of interconnected computer networks that use a standard Internet protocol suite to link computing devices. The computer network may generally be referred to herein as "the Internet." As used herein, aircraft having a predefined route and whose purpose is primarily providing transport services including airplanes, commercial airplanes, such as passenger airplanes and cargo airplanes as well as general aviation airplanes. Aircraft also includes air balloons, gliders, unmanned aerial vehicles (UAVs), helicopters and the like. Aircraft may be configured to fly in a predefined route and with a primary purpose of providing transport services. In implementations, remote Internet users can connect to the aircraft via downlinks that can be direct wireless connections to the aircraft or land-based stations that relay data communications between the airplanes and end users. A downlink as used herein refers to a connection from data communications equipment towards data terminal equipment, such as subscriber devices. The aircraft are in turn connected to an Internet backbone through uplinks that can include satellites, other aircraft, and ground stations. As used herein, an uplink refers to a connection from a data communications equipment towards a network core such as an Internet backbone. A major drawback of proposed alternative balloon and dedicated aircraft solutions is cost and therefore scalability into remote regions. Implementations described herein therefore use existing infrastructure, aircraft and locally available spectrum. In some implementations, the downlink may use dynamic spectrum access to use a locally available spectrum to provide Internet service. As used herein, dynamic spectrum access refers to techniques for using spectrum holes or white spaces in the licensed spectrum bands. Therefore, the present implementations provide a cost-efficient method of providing Internet to remote regions.

In implementations, the system can work in real-time or can be based on caching and updates. In some examples, ground-based stations and/or personal devices may have a caching application for communication with the airplanes. Furthermore, in some implementations, the system can interleave data into existing communications channels, such as the Automatic Dependent Surveillance-Broadcast (ADS-B) channels described in detail below, to efficiently use existing spectrum resources.

FIG. 1 is a block diagram of an example of a computing system for providing large-scale Internet connectivity. The computing system 100 may be, for example, a personal mobile device, laptop computer, desktop computer, tablet computer, computer server, or an airplane computer, or computer on a moving object, among others. The computing system 100 may include a processor 102 that is adapted to execute stored instructions, as well as a memory device 104 that stores instructions that are executable by the processor 102. The processor 102 can be a single core processor, a multi-core processor, a computing cluster, or any number of other configurations. The memory device 104 can include random access memory, read-only memory, flash memory, or any other suitable memory systems. The memory device 104 includes computer-readable storage media that includes volatile memory and nonvolatile memory.

The basic input/output system (BIOS), containing the basic routines to transfer information between elements within the computer 502, such as during start-up, is stored in nonvolatile memory. By way of illustration, and not limitation, nonvolatile memory can include read-only memory (ROM), programmable ROM (PROM), electrically programmable ROM (EPROM), electrically erasable programmable ROM (EEPROM), or flash memory. Volatile memory includes random access memory (RAM), which acts as external cache memory. By way of illustration and not limitation, RAM is available in many forms such as static RAM (SRAM), dynamic RAM (DRAM), synchronous DRAM (SDRAM), double data rate SDRAM (DDR SDRAM), enhanced SDRAM (ESDRAM), SynchLink™ DRAM (SLDRAM), Rambus® direct RAM (RDRAM), direct Rambus® dynamic RAM (DRDRAM), and Rambus® dynamic RAM (RDRAM).

The instructions that are executed by the processor 102 can be used to relay Internet traffic through aircraft. For example, the instructions can cause an airplane to establish a downlink with a remote subscriber and provide Internet services. In some implementations, the instructions may be used to cache data. As used herein, caching refers to transparently storing data so that future requests for the data can be served faster in addition to transparently storing data for a delayed transmission.

The processor 102 may be connected through a system bus 106 (e.g., PCI®, PCI-Express®, etc.) to an input/output (I/O) device interface 108 adapted to connect the computing system 100 to one or more I/O devices 110. The system bus 106 can be any of several types of bus structure, including the memory bus or memory controller, a peripheral bus or external bus, and a local bus using any variety of available bus architectures known to those of ordinary skill in the art. The I/O devices 110 may include, for example, a keyboard, a gesture recognition input device, a voice recognition device, and a pointing device, wherein the pointing device may include a touchpad or a touchscreen, among others. The I/O devices 110 may be built-in components of the computing system 100, or may be devices that are externally connected to the computing system 100.

The processor 102 may also be linked through the system bus 106 to a display device interface 112 adapted to connect the computing system 100 to a display device 114. The display device 114 may include a display screen that is a built-in component of the computing system 100. The display device 114 may also include a computer monitor, television, or projector, among others, that is externally connected to the computing system 100. A network interface card (NIC) 116 may also be adapted to connect the computing system 100 through the system bus 106 to a network (not depicted) and/or remote device through an uplink device 118, a downlink device 120, or both. As used herein, a remote device can include a base station or remote subscriber device capable of connecting to a downlink device. A remote subscriber device, as used herein, includes computers, gaming systems, smartphones, personal devices, and the like. For example, the moving object can connect to a personal device via a downlink device 120 and a satellite via an uplink device 118. In some examples, a downlink device 120 can connect a base station or a terrestrial wireless device such as a subscriber device to an aircraft computer 100. In some examples, an uplink device 118 can connect an aircraft to another aircraft, a satellite, or a terrestrial station to provide Internet access to a user via a remote device, as described in FIGS. 4A-4C below.

The storage 122 can include a hard drive, an optical drive, a USB flash drive, an array of drives, or any combinations thereof. The storage 122 may include a dynamic spectrum module 124, a communications module 126, and a caching module 128 with associated cache store 130. In some implementations, the dynamic spectrum module 124 can determine a spectrum to use for a downlink and/or uplink. For example, the dynamic spectrum module 124 can determine that a specific portion of spectrum is available for use at a location as an uplink and a different portion of spectrum is available for use as a downlink. As discussed above, two thirds of the world currently does not receive Internet access. However, remote regions lacking access are also more likely to have large amounts of available spectrum. The dynamic spectrum module 124 may take advantage of areas with unused spectrum by making full use of the spectrum that is available to provide Internet access. In some implementations, the dynamic spectrum module 124 can use dynamic spectrum access to increase the amount of available spectrum for Internet access. For example, the dynamic spectrum module 124 can determine the available spectrum along the route of an airplane and provide service to remote devices along the route. The remote devices then provide the service to users.

In some implementations, the communications module 126 can receive an available spectrum from the dynamic spectrum module 124 and establish a downlink using the available spectrum. For example, a downlink device 120 can connect the aircraft to a remote subscriber's personal device or a base station that is connected to remote subscribers. In some implementations, the communications module 126 can use at least one dedicated portion of spectrum as a downlink and/or uplink. In some implementations, the communications module 126 can use existing communications channels as a downlink and/or uplink. For example, the communications module 126 can use ADS-B channels as a downlink and/or uplink. ADS-B currently includes the two different services "ADS-B Out" and "ADS-B In." ADS-B Out periodically broadcasts information about each aircraft, such as identification, current position, altitude, and velocity, through an onboard transmitter. ADS-B In provides for the reception by aircraft of Flight Information Services-Broadcast (FIS-B) data, Traffic Information Services-Broadcast (TIS-B) data, and other ADS-B data such as direct communication from nearby aircraft. FIS-B in turn provides weather text, weather graphics, Notice to Airmen (NOTAMs), Automatic Terminal Information Service (ATIS), and similar information. In some examples, the ADS-B channels can be used for existing communications data as well as providing Internet service by interleaving the two or more streams of data. For example, low-bandwidth data such as email or messaging can be interleaved with any of the above ADS-B communications. Thus, in some examples, remote subscribers can be provided at least some Internet service through the use of dedicated and/or existing communications channels.

In some implementations, the communications module 126 can handoff a downlink connection to another moving object. For example, a second airplane may be within range of a remote subscriber device or base station as a first airplane is about to lose its downlink with the device or station. In this scenario, the first airplane can handoff the downlink to the second airplane such that the device or station receives uninterrupted Internet access, as discussed in the description of FIG. 3 below.

In some implementations, the communications module 126 can steer a directional antenna. For example, the downlink and/or uplink device can use a directional antenna to send and receive data. In some examples, the communications module can steer the directional antenna to increase link margin. As used herein, link margin refers to the difference between a wireless receiver's sensitivity (i.e., the received power at which the receiver will stop working) and the actual received power, as measured in decibels. Using steerable directional antennas provides longer duration of coverage and a narrower beam width for higher power and less interference.

In some implementations, the caching module 128 can cache data from the remote subscriber device or the Internet for later use. For example, the communications module 126 may not be able to handoff a downlink connection to provide uninterrupted Internet service. In some implementations, the caching module 128 can temporarily store data to be sent out when a subsequent aircraft arrives. Thus, the caching module 128 can provide for a form of delay-tolerant networking (DTN), in which caching is used to address lack of continuous network connectivity. In some examples, the caching module 128 can also store Internet content that is frequently requested or locally popular. For example, news sites may be cached in addition to blogs, and the like. In some examples, the caching module 128 can also cache larger data such as media content. For example, an aircraft may have such content cached onto its local cache store 130 at an airport. In some examples, the aircraft communications module 126 can transfer the cached content onto cache stores 130 of base stations as described in FIG. 2A below.

In some examples, a moving object can send multicasts of news data to remote devices along its route. For example, an aircraft can multicast news data to base stations that have subscribed to receive the multicasts. In some examples, the base stations can cache the news data for later retrieval by remote subscriber devices.

It is to be understood that the block diagram of FIG. 1 is not intended to indicate that the computing system 100 is to include all of the components shown in FIG. 1. Rather, the computing system 100 can include fewer or additional components not illustrated in FIG. 1 (e.g., additional applications, additional modules, additional memory devices, additional network interfaces, etc.). Furthermore, any of the functionalities of the dynamic spectrum module 124, the communications module 126, and the caching module 128 can be partially, or entirely, implemented in hardware and/or in the processor 102. For example, the functionality can be implemented with an application specific integrated circuit, in logic implemented in the processor 102, or in any other device. For example, and without limitation, illustrative types of hardware logic components that can be used include Field-programmable Gate Arrays (FPGAs). Program-specific Integrated Circuits (ASICs), Program-specific Standard Products (ASSPs), System-on-a-chip systems (SOCs), and Complex Programmable Logic Devices (CPLDs), etc.

FIG. 2A is a diagram of an example airplane providing large-scale Internet connectivity, according to implementations described herein. The configuration of FIG. 2A is generally referred to by the reference number 200A. Airplane 202 is connected to a remote area 204 through base station 206 via downlink 208. Airplane 202 is also connected to remote subscriber device 210 via a second downlink 212. The remote area 204 and the remote subscriber device 210 are terrestrially located on the ground, as indicated by the line 211. Airplane 202 is also further connected to the Internet 214 via an uplink 216. The group of remote subscriber devices 204 includes a computer server 218 at base station 206, a gaming system 220 that is connected to base station 206 via fiber optic cable 222, and two personal devices 224 connected to base station 206 via wireless connections 226. Although an airplane is used for illustrative purposes, airplane 202 can also be any suitable aircraft as discussed above in regard to FIG. 1.

In the diagram of FIG. 2A, two example downlinks are illustrated. In some implementations, the moving airplane 202 can provide Internet service to remote subscribers via a base station 206. The base station 206 connects to remote subscriber devices 220, 224, and 226, via a cable 222 or wireless connection 226 and relays the data to airplane 202 via downlink 208. The airplane 202 then relays the data to and from Internet 214 through uplink 216. In some implementations, dynamic spectrum module 124 can determine which parts of spectrum are available in remote area 204 such that communications module 126 can form a fast downlink 208 with base station 206. In some examples, the dynamic spectrum module 124 can use dynamic spectrum access to determine that a large portion of spectrum is available in area 204. For example, the segment of spectrum called white spaces may be completely available in area 204. White spaces, as used herein, refers to spectrum that has been allocated to broadcasting services but are locally unused. White spaces include ultra-high frequency (UHF) and very-high frequency (VHF) bands that are available as a result of the switchover to digital television. The communications module 126 can use a white space portion of the spectrum to send and/or receive data to and/or from base station 206 via downlink 208.

In some implementations, base station 206 can include computer server 218 that includes a cache store, such as the cache store 130 discussed above in reference to FIG. 1. In some examples, a caching module, such as caching module 128 of FIG. 1, on the computer server 218 can receive data from remote subscriber devices 220 and 226 and cache the data onto the cache store 130. The base station 206 can send the cached data to plane 202 when communications module 126 of airplane 202 establishes downlink 208. In some implementations, the base station 206 can receive data from airplane 202 through downlink 208. In some examples, the base station 206 can send the data to a cache store 130 on computer server 218. The caching module 128 can communicate with the base station 206 to provide the data in the cache store 130 when requested by remote subscriber devices 220, 226.

Similarly, in some implementations, the moving airplane 202 can provide Internet service directly to remote subscribers through a downlink 212 to the remote subscriber device 210. In some examples, the dynamic spectrum module 124 can also determine available spectrum in the vicinity of the remote subscriber device 210. The communications module 126 can then establish a downlink 212 to provide Internet service. In some examples, a remote subscriber device 210 can access the Internet via downlink 212 while base station uploads cached data via link 208, and vice versa. For example, remote subscriber device 210 can also store and upload cached data via a caching application that can be installed on remote subscriber device 210.

In some implementations, airplane 202 of FIG. 2A can also use ADS-B technology to provide Internet services. For example, dynamic spectrum module 124 may determine that an area 204 has little or no available spectrum. In some examples, this could be due to the use of all available white space by licensed devices with greater priority such as wireless microphones, among other devices. The dynamic spectrum module 124 can send the spectrum availability information to the communications module 126. In some implementations, the communications module 126 can use a dedicated portion of the spectrum to offer Internet services. For example, a portion of the spectrum may be dedicated for airplane use. In some examples, communications module 126 may use the portion of spectrum dedicated to ADS-B as a downlink 208, 212. In some implementations, the data coming to and/or from base station 206 and/or remote subscriber device 210 can be interleaved with existing communications using ADS-B spectrum. In using ADS-B or unused spectrum such as white spaces, the system 200A has an advantage of using otherwise unallocated resources to bring Internet access to remote regions.

Figure 2B:
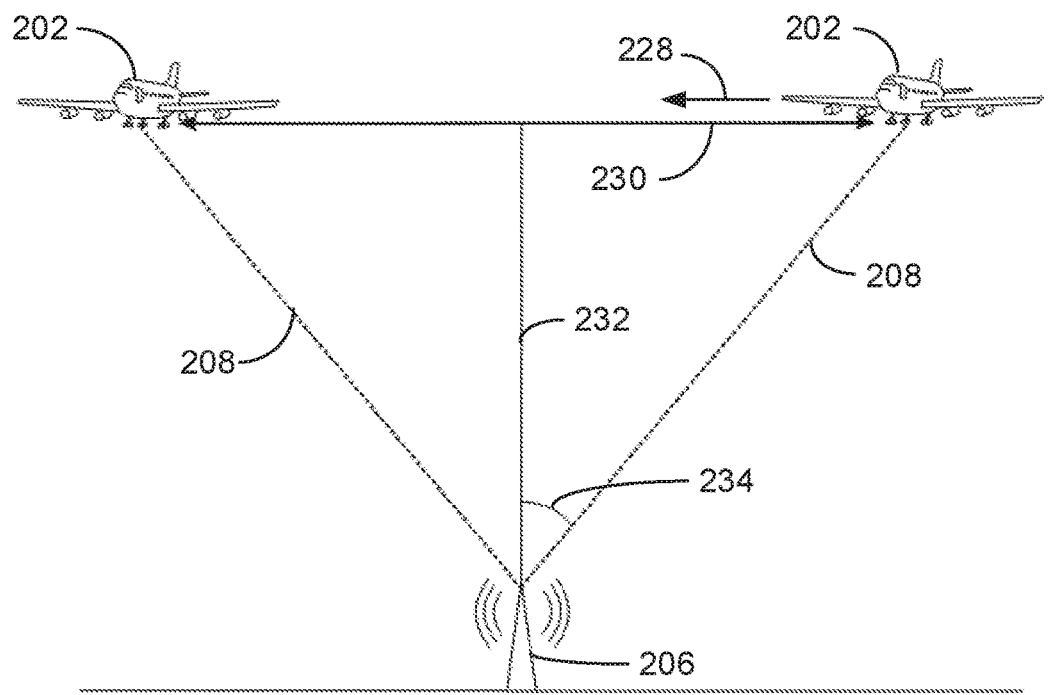
FIG. 2B is a diagram of connection distance and duration of an example airplane, according to the implementations described herein.

FIG. 2B is a diagram of connection distance and duration of an example airplane, according to implementations described herein. The functionality of FIG. 2B may be referred to generally by the reference number 200B.

In FIG. 2B, airplane 202 is connected to base station 206 via downlink 208 and is travelling at a height 232 of about 10,000 meters. Airplane 202 has flown from the right to the left at a speed of 250 meters per second as indicated by arrow 228 for a total distance 230 of about 34641 meters. Angle 234 measures approximately 60 degrees.

In 200B, the distance 230 of 34,641 meters flown by airplane 202 at a speed 228 of 250 m/s takes about 138 seconds. The connection duration of airplane 202 via downlink 208 therefore is about 138 seconds. In some implementations, the distance of the specific segment for the connection and thus also the connection duration of airplane 202 is based in part on an allowable transmit power for downlink 208. For example, if the dynamic spectrum module 124 determines a low potential for interference using a portion of spectrum in an area then the transmit power for that portion of spectrum can be relatively larger. In areas where high potential for interference exists, the transmit power of corresponding spectrum is reduced to prevent interference. The weaker the transmit power, the shorter the connection length and duration. In some implementations, the dynamic spectrum module 124 can receive data such as spectrum usage maps. The dynamic spectrum module 124 can use the spectrum usage maps to determine a portion of spectrum and transmit power to use for downlink 208. In some examples, a downlink can use existing very high frequency (VHF) radios that are already installed in aircraft. For example, VHF modems can be installed on aircraft to use existing VHF communication infrastructure such as antennas on an airplane to establish both an uplink and a downlink. In some implementations, the communications module 126 may search for other airplanes to handoff downlink 208 during the connection duration. In some examples, where flight traffic is less frequent, the caching module 128 can cache data into cache store 130. In some implementations, base station 206 caches email and other data in a cache store 130. The base station 206 can upload the cached data to the airplane 202 during the connection duration.

Figure 3:
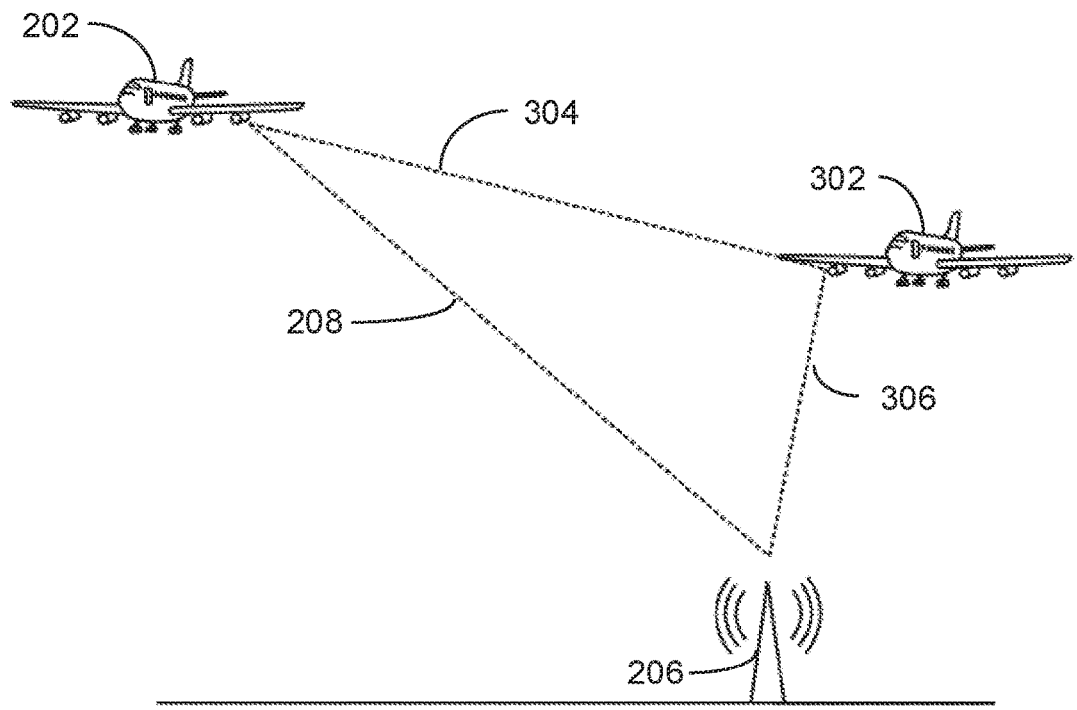
FIG. 3 is a diagram of an example migration of a connection between two airplanes, according to the implementations described herein.

FIG. 3 is a diagram of an example migration of a connection between two airplanes, according to implementations described herein. The migration as described in FIG. 3 is generally be referred to by the reference number 300. In FIG. 3, airplane 202 is connected to base station 206 via downlink 208. Airplane 202 is also connected to airplane 302 via handoff connection 304. Airplane 302 is also connected to base station 206 via downlink 306.

In the diagram of FIG. 3, airplane 202 has flown over base station 206 and is about to drop downlink 208 with base station 206. In implementations, communications module 126 can establish a handoff connection 304 with the nearby airplane 302. In some implementations, the base station 206 chooses the nearby airplane 302 and sends this information to airplane 202. The communications module 126 of airplane 202 can then send downlink information to a communications module 126 on airplane 302. In some implementations, airplane 302 can establish a downlink 306 with base station 206 such that base station 206 experiences little to no Internet disruption. For example, airplane 202 can establish handoff connection 304 before downlink 208 is disconnected. In some implementations, airplane 202 can send link state information of downlink 208 to airplane 302. As used herein, link state information includes link state packets that may contain names, a cost, or distance to any neighboring routers and associated networks, among other information. Airplane 302 can receive the link state information from airplane 202 and establish a downlink 306. In some implementations, downlink 208 is migrated to downlink 306. In some implementations, downlinks 208, 306 can provide concurrent service to base station 206. In some examples, the services being provided by downlink 208 can be provided by downlink 306 when airplane 202 flies out of range of base station 202.

FIG. 4A is a diagram of an example uplink using a satellite. The uplink configuration of FIG. 4A is generally referred to by the reference number 400A. In FIG. 4A, airplane 202 is connected to base station 206 via downlink 208. Airplane 202 is also connected to satellite 402 via uplink 404. Satellite 402 is connected to antenna 406 via uplink 408. Antenna 406 is connected to the Internet via connection 410.

In the diagram of 4A, airplane 202 is providing Internet service to base station through downlink 208. The airplane 202 routes data from base station 206 to satellite 402. In some implementations, satellite 402 is one of multiple satellites orbiting the Earth. Airplane 202 receives and/or sends data to and/or from satellite 402 via uplink 402. An advantage of configuration 400A is that the power used to send signals through uplink 404 can be much lower than the power used to send through uplink 408. Moreover, base stations 206 may be cheaper and easier to operate than antenna 406.

FIG. 4B is a diagram of an example uplink using a direct relay. The uplink configuration of FIG. 4B is generally referred to by the reference number 400B. In FIG. 4B, airplane 202 is connected to base station 206 via downlink 208. Airplane 202 is also connected to base station 412 via uplink 414. Base station 412 is connected to the Internet 214 via connection 416.

In the diagram of FIG. 4B, a direct relay is formed using the airplane 202 as the point of relay. In some implementations, the communications module 126 can establish two concurrent connections with base stations 206, 416 such that a downlink 208 is established with base station 206 and an uplink with base station 412. An advantage of configuration 400B is the use of less infrastructure. However, the connection duration in configuration 400B may be less than in 400A.

Figure 4C:
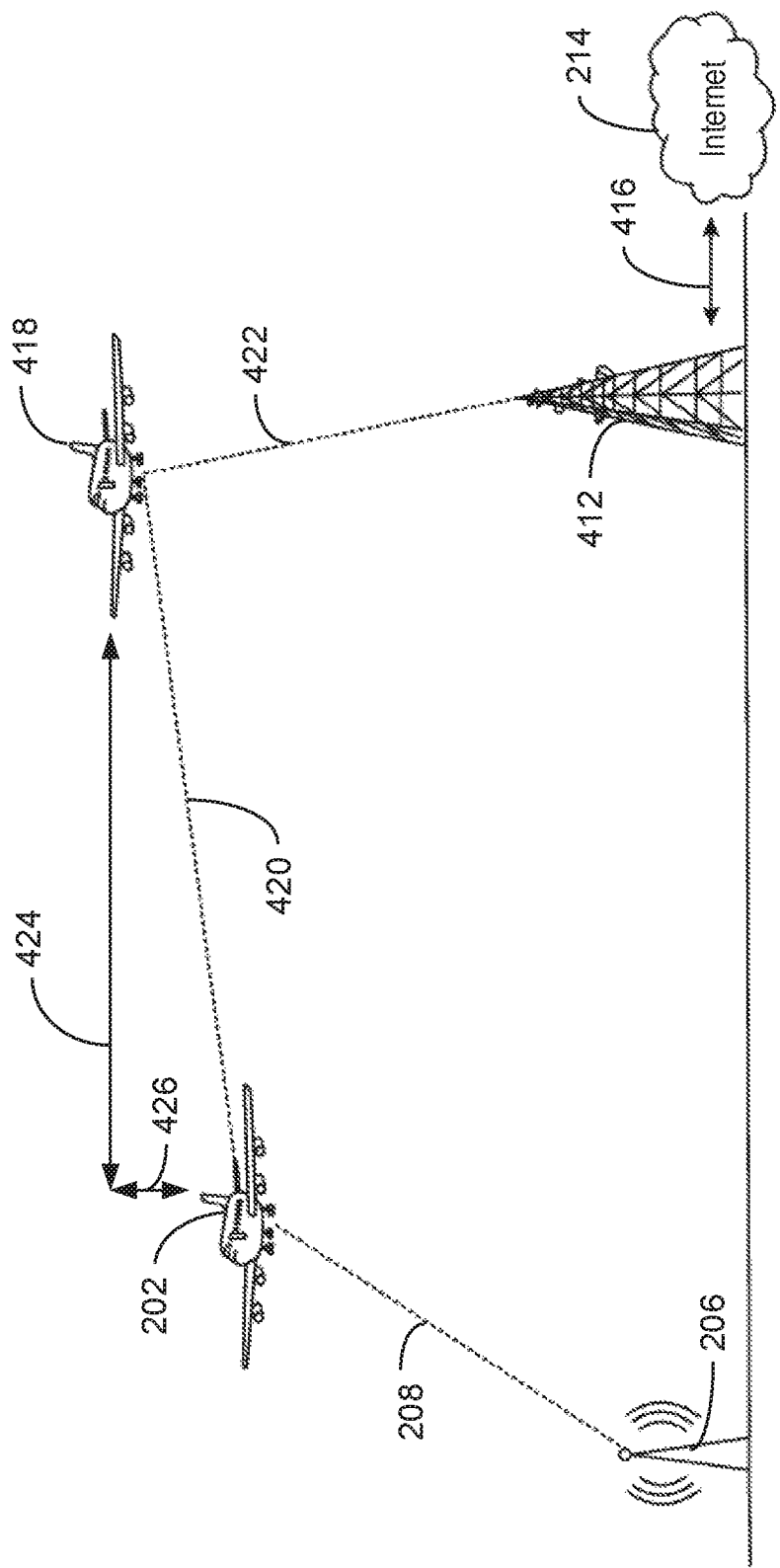
FIG. 4C is a diagram of an example uplink using a peer-to-peer relay.

FIG. 4C is a diagram of an example uplink using a peer-to-peer relay. The uplink configuration of FIG. 4C is generally referred to by the reference number 400C. In FIG. 4C, airplane 202 is connected to base station 206 via downlink 208. Airplane 202 is also connected to another airplane 418 via uplink 420. The second airplane 418 is connected to a based station 412 via uplink 422. Base station 412 is connected to the Internet 412 via connection 416. Airplane 202 is separated from airplane 418 by horizontal distance 424 and vertical distance 426.

In the diagram of FIG. 4C, airplane 418 can relay data between airplane 202 and base station 412. For example, the vertical distance 426 can be greater than about 2,000 feet and horizontal distance 424 can be greater than about two miles. In some examples, airplane 202 may be out of range to establish a direct downlink with base station 412. In implementations, airplane 418 is one of multiple aircraft that can be used to relay data from airplane 202 to base station 412. In some examples, unused spectrum such as that used by terrestrial TV broadcast and FM radio links can be used. In the United States, the amount of available spectrum for such use is approximately 350 megahertz. In some examples, the available spectrum can be divided among airplanes for exclusive spectrum use for reach airplane at any point in time. In some examples, the airplanes can also use frequency-division duplexing (FDD) for communication among the airplanes. As used herein, FDD refers to the operation of transmitters and receivers at different carrier frequencies.

FIG. 5 is a detailed process flow diagram of an example method for providing Internet connectivity via commercial aircraft. The method of FIG. 5 is referred to generally by the reference number 500.

At block 502, dynamic spectrum module 124 determines an available spectrum to use for an uplink and a downlink. As discussed above, available spectrum can include white spaces that include UHF and VHF bands, as well as existing communications channels such as ADS-B. In some examples, the dynamic spectrum module 124 can determine available spectrum through channel discovery based on local information and information from external sources. For example, the dynamic spectrum module 124 can investigate spectrum units within the spectrum for the presence of a channel in linear succession. In some examples, the dynamic spectrum module 124 can investigate the spectrum units within the spectrum for the presence of a channel in a staggered fashion, skipping over one or more spectrum units in a linear success of spectrum units. The skipping can be performed to investigate the available spectrum for the presence of the channel on a class-width-by-class-width basis, starting with the largest class width first. In some examples, the dynamic spectrum module 124 can receive white space information from remote or local geolocation services and determine the available spectrum to use along a route from the received white space information. For example, white space information for a given location can be computed by the geolocation services based on television transmitter parameters, elevation data, and information received regarding any operational wireless microphones. In some implementations, the dynamic spectrum module 124 can use the received white space information to determine which spectrum to use for a downlink and/or an uplink along a flight path.

At block 504, the dynamic spectrum module 124 can determine a transmit power for the uplink and connect the moving object to an Internet connection. As discussed above, in some examples, an uplink can connect an aircraft to another aircraft, a satellite, or a base station to connect the aircraft to the Internet. In some examples, the dynamic spectrum module 124 can choose a transmit power based on the distance of the uplink. For example, the dynamic spectrum module 124 can determine a transmit power that would efficiently connect the two devices. In some examples, the dynamic spectrum module 124 can also take spectrum interference into account when determining a transmit power.

At block 506, the dynamic spectrum module 124 can determine a transmit power for the downlink and connect a remote subscriber to the moving object via the downlink. In some implementations, the remote subscriber can be connected to a base station that is connected to moving object via a downlink. In some implementations, the remote subscriber can be connected directly by a downlink between the remote subscriber device and the moving object. In some examples, the available spectrum in a given location can vary widely along a given path of a moving object. Therefore, in some implementations, the dynamic spectrum module 124 can determine a transmit power that does not cause interference with portions of spectrum already in use. For example, a channel may be available at a particular base station but in use at an area that is nearby the base station. The dynamic spectrum module 124 can limit the transmit power when using the channel such that interference with the nearby use is prevented.

At block 508, the communications module 126 provides an Internet connection to the remote device. In implementations, when both a downlink and an uplink is established, a remote subscriber can receive Internet service via the remote device. As mentioned above, in some implementations, the aircraft can provide Internet service to a base station that can relay service to connected remote subscribers. In some examples, the Internet connection can last a few minutes and/or be available a few times a day. In some examples, the Internet connection can be continuous such that remote subscribers experience little or no packet loss. For example, the communications module 122 can migrate the connection as discussed in block 510 below. In some examples, latency sensitive applications such as VoIP communications can be used during predetermined hours of continuous Internet connectivity.

At block 510, the communication modules 122 can migrate the downlink to a second downlink of a second moving object. As discussed in FIG. 3, in some implementations, the link state information of downlink 208 can be migrated to downlink 304 the second airplane 302 while both airplanes are in range of base station 206. By migrating the downlink through handoff connections, a continuous Internet connection is possible in areas with even moderate air traffic.

At block 512, the caching module 128 can cache content on each moving object. In some implementations, the caching module 128 can be on an aircraft computer 100 cache store 130. For example, the cache store 130 can include Internet content such as email, commonly accessed web content, common search results, and advertisements, among other content. Corresponding user queries can be answered directly by the caching module 128 rather than searching the Internet. In some implementations, the caching module 128 can also cache content such as large media files while the aircraft is at an airport. In some examples, an aircraft can be connected to remote subscribers through a downlink but not be connected to the Internet at that time. In implementations, the caching module 124 can cache data from remote subscribers, such as email, blog updates, or social media, in a cache store 130. In some examples, the data in the cache store 130 can be encrypted for the security and privacy of the remote subscribers.

At block 514, the caching module 128 can cache content at a base station communicatively connected to both the remote subscriber and the moving object. In some examples, the caching module 128 can anonymously determine the popularity of data requested by the remote subscribers connected to the base station. In some implementations, the caching module 128 can cache popular data in the cache store for a predetermined amount of time. In some examples, the base station may be in an area with irregular air traffic. In some implementations, the caching module 128 can cache data from the remote subscribers for future submission. For example, email, blog updates, and social media can be securely stored on the cache store and uploaded to the Internet when the next available aircraft arrives or the remote subscriber device comes within range of a base station.

At block 516, the caching module 128 can cache content on a remote subscriber device via a caching application. In some examples, a remote subscriber device may not have an available base station or airplane to receive Internet service. In some implementations, the caching module 128 can be part of an application installed on a remote subscriber device. For example, the caching module 128 can cache user content, such as email or social media, in a cache store 130 created on the remote subscriber device.

The process flow diagram of FIG. 5 is not intended to indicate that the operations of the method 500 are to be executed in any particular order, or that all of the operations of the method 500 are to be included in every case. For example, given a consistent air traffic, the blocks of 512-516 for caching content may not be executed. In some examples, air traffic in remote regions may not have enough aircraft to execute block 510. For example, a remote subscriber device or base station may never encounter two airplanes within range at the same time. Further, any number of additional operations can be included within the method 500, depending on the specific application.

Figure 6:
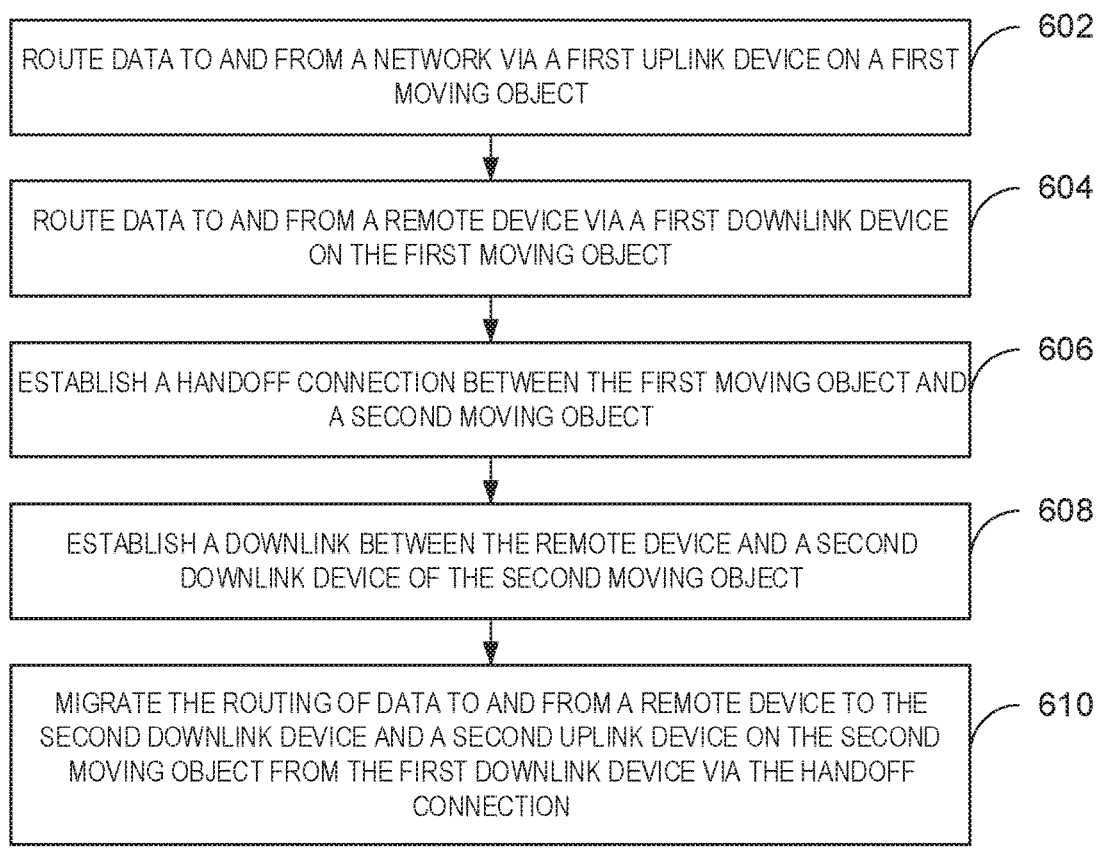
FIG. 6 is a detailed process flow diagram of an example method for migrating a downlink between aircraft.

FIG. 6 is a detailed process flow diagram of an example method for migrating a downlink between aircraft. The method of FIG. 6 is generally referred to by the reference number 600.

At block 602, the communications modules 120 routes data to and from a network via a first uplink device on a first moving object. In some implementations the moving object can be an aircraft. For example, the moving object can be an airplane. In implementations, the uplink can be a satellite as in FIG. 4A, a base station such as in FIG. 4B, and/or another aircraft such as in FIG. 4C. In some implementations, the connection to the network, such as the Internet, can be continuous. In some implementations, the connection to the network can be intermittent.

At block 604, the communications module 120 routes data to and from a remote subscriber device or base station via a first downlink device on the first moving object. As discussed above, the first downlink device can be connected directly to a remote subscriber device or to a base station that relays data to and from remote subscriber devices.

At block 606, the communications module 120 establishes a handoff connection between the first moving object and a second moving object. In some implementations, the dynamic spectrum module can determine an available portion of spectrum to use for air-to-air communication. The communications module can use a portion of the available spectrum for the handoff connection.

At block 608, the communications module 120 establishes a downlink between the remote subscriber device or base station and a second downlink device on the second moving object. In some examples, the communications module 120 of a first aircraft provides the remote subscriber device or base station with information about a second aircraft such as its location and a portion of spectrum to use for the second downlink. In some implementations, the communications module 120 of the second aircraft can establish a second downlink with the remote subscriber device or base station.

At block 610, the communications module 120 migrates the routing of data to and from a remote device to the second downlink device and a second uplink device on the second moving object from the first downlink device via the handoff connection. In some implementations, link state information is passed from the first moving object to the second moving object. For example, a communications module 120 on a first aircraft can send link state information to a communications module 120 on a second aircraft to migrate the routing of data to and from a remote device.

The process flow diagram of FIG. 6 is not intended to indicate that the operations of the method 600 are to be executed in any particular order, or that all of the operations of the method 600 are to be included in every case. Further, any number of additional operations can be included within the method 600, depending on the specific application.

Figure 7:
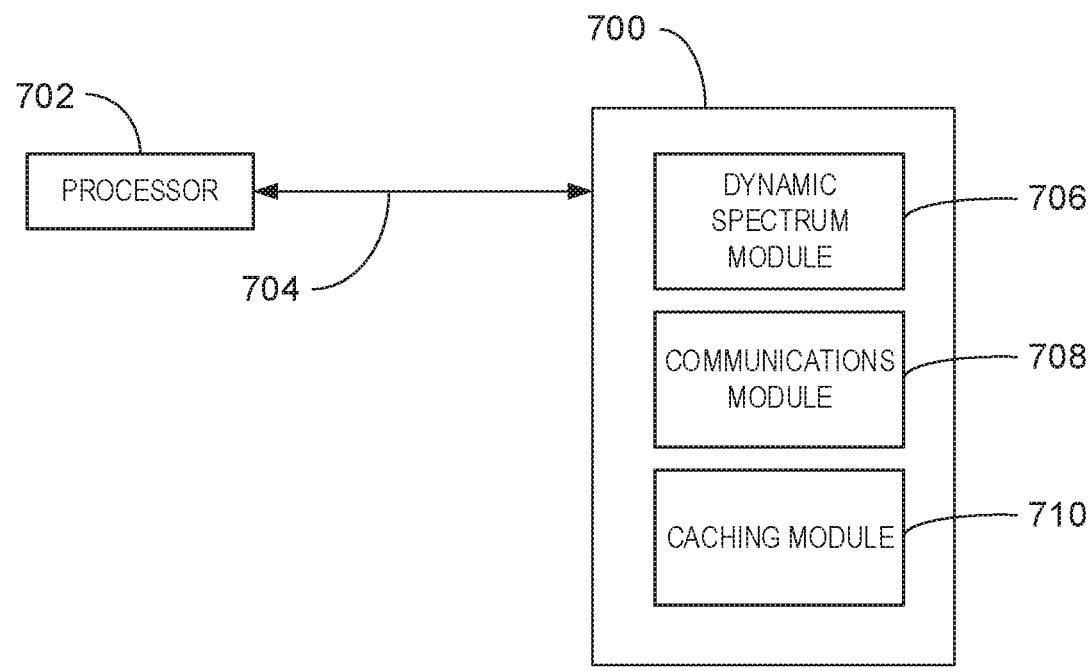
FIG. 7 is a block diagram showing a tangible, computer-readable storage media that can be used to provide Internet access via aircraft.

FIG. 7 is a block diagram showing a tangible, computer-readable storage medium that can be used to provide Internet access via moving object. The tangible, computer-readable storage media 700 may be accessed by a processor 702 over a computer bus 704. Furthermore, the tangible, computer-readable storage media 700 may include code to direct the processor 702 to perform the current methods. For example, methods 500 and 600 can be performed by the processor 702.

The various software components discussed herein may be stored on the tangible, computer-readable storage media 700, as indicated in FIG. 7. For example, the tangible computer-readable storage media 700 can include a dynamic spectrum module 706, a communications module 708, and a caching module 710. In some implementations, the dynamic spectrum module 706 can cause the processor to determine an available portion of spectrum using dynamic spectrum access. For example, the available spectrum can be a portion of white space or ADS-B communications channel. In some implementations, the dynamic spectrum module 706 can also cause the processor to determine a transmit power. For example, the dynamic spectrum module 706 can take pre-existing use of portions of a spectrum into account when determining a transmit power. In implementations, the communications module 708 can cause the processor to establish a downlink using the available spectrum. In implementations, the communications module 708 can cause the processor to send and receive data to and from a remote subscriber and relay the data to and from a publicly available network via an uplink. For example, the uplink can be configured as in 400A, 400B, or 400C of FIGS. 4A-4C. In some implementations, the caching module 710 can cause the processor to cache at least some of the data for later sending or retrieval. In some implementations, the communications module 708 can cause the processor to migrate the downlink to a second moving aircraft. In some implementations, the communications module 708 can cause the processor to steer a directional antenna. In some implementations, the communications module 708 can cause the processor to interleave at least some of the data with existing ADS-B communications.

It is to be understood that any number of additional software components not shown in FIG. 7 can be included within the tangible, computer-readable storage media 700, depending on the specific application. Although the subject matter has been described in language specific to structural features and/or methods, it is to be understood that the subject matter defined in the appended claims is not necessarily limited to the specific structural features or methods described above. Rather, the specific structural features and methods described above are disclosed as example forms of implementing the claims.

EXAMPLE 1

An example of a moving object is provided. The example moving object includes an uplink device of the moving object to connect the moving object to a publicly available computer network. The example moving object includes a downlink device of the moving object to be communicatively coupled to a remote device at a specific segment along a route of the moving object. The remote device is to provide data received via the downlink device to a user. The example moving object also includes a cache store communicatively coupled to the uplink device and the downlink device.

In some implementations, the example moving object can be an aircraft. In some implementations, the example moving object can be an airplane. In some implementations, the specific segment can be based at least in part on a transmit power for the downlink device. In some implementations, the downlink device can use Automatic Dependent Surveillance-Broadcast (ADS-B) technology to route at least some of the data and at least some the data can be interleaved with other ADS-B communications. In some implementations, the downlink device can use a portion of spectrum determined through dynamic spectrum access. In some implementations, the example moving object can be a first moving object and the downlink device can be a first downlink device. The first moving object can be communicatively coupled to the second moving object with a second downlink device via a handoff connection between the first moving object and second moving object. The data can be routed to the remote device via the second downlink device. In some implementations, the uplink device and the downlink device can use different portions of spectrum and the uplink device can connect the moving object to the computer network. In some implementations, the cache store can store data from the remote subscriber after a connection with the downlink device is lost. The stored data from the remote subscriber can be sent to a second moving object through a second downlink device. In some implementations, the cache store can include data received from the publicly available computer network.

EXAMPLE 2

An example of a method is described herein. The example method includes routing data to and from a network via a first uplink device on a first moving object. The example method includes routing data to and from a remote device via a first downlink device on the first moving object. The example method includes establishing a handoff connection between the first moving object and a second moving object. The example method includes establishing a downlink between the remote device and a second downlink device of the second moving object. The example method includes migrating the routing of data to and from the remote device to the second downlink device and a second uplink device on the second moving object from the first downlink device via the handoff connection.

In some implementations, the first and second moving objects can be aircraft. In some implementations, the first and second moving objects can be airplanes. In some implementations, the example method can further include determining a portion of spectrum to be used by the first and the second downlink device using dynamic spectrum access. In some implementations, the example method can include caching at least some of the data on at least one of the first or the second moving objects. In some implementations, the example method can include caching at least some of the data on the remote device. The remote device can be a remote subscriber device. In some implementations, the example method can include caching at least some of the data at the remote device. The remote device can also be a base station communicatively connected to a remote subscriber. In some implementations, the cached data at the base station can be retrieved by a subsequent moving object.

EXAMPLE 3

An example of one or more computer-readable storage media is described herein. The example one or more computer-readable storage media include a plurality of instructions that, when executed by a processor, cause the processor to determine an available spectrum via dynamic spectrum access. The example computer-readable storage media include instructions to establish a downlink to a remote device via a downlink device of a moving object using the available spectrum. The example computer-readable storage media include instructions to establish an uplink to a publicly available network via an uplink device of the moving object using a different portion of spectrum. The example computer-readable storage media include instructions to send and receive data to and from a remote device, the data to be relayed to and from the network via the uplink device.

In some implementations, the moving object can be an aircraft. In some implementations, the moving object can be an airplane. In some implementations, the example computer-readable storage media can include instructions to cache at least some of the data for later sending or retrieval in a cache store on the moving object. In some implementations, the example computer-readable storage media can include instructions to migrate the downlink to a downlink device of a second moving object. In some implementations, the example computer-readable storage media can include instructions to steer a directional antenna of the downlink device. In some implementations, the example computer-readable storage media can include instructions to interleave at least some of the data with ADS-B communications.

EXAMPLE 4

An example of an apparatus is provided. The example apparatus includes a means for connecting the apparatus to a publicly available computer network. The example apparatus includes a means for communicatively coupling to a remote device at a specific segment along a route of the apparatus and providing data received from the publicly available computer network to a user. The example apparatus includes a means for caching data.

In some implementations, the example apparatus can be an aircraft. In some implementations, the example apparatus can be an airplane. In some implementations, the specific segment can be based at least in part on a transmit power for the downlink device. In some implementations, the means for communicatively coupling to a remote device can use Automatic Dependent Surveillance-Broadcast (ADS-B) technology to route at least some of the data and at least some the data can be interleaved with other ADS-B communications. In some implementations, the means for communicatively coupling to a remote device can use a portion of spectrum determined through dynamic spectrum access. In some implementations, the example apparatus can include a means for communicatively coupling with a moving object. The moving object can include a means for routing data to the remote device. In some implementations, the means for connecting the apparatus to a publicly available network and the means for communicatively coupling to a remote device can use different portions of spectrum. In some implementations, the means for caching data can store data from the remote subscriber after a connection with the downlink device is lost. In some implementations, the means for caching data can include data received from the publicly available computer network.

What has been described above includes examples of the claimed subject matter. It is, of course, not possible to describe every conceivable combination of components or methodologies for purposes of describing the claimed subject matter, but one of ordinary skill in the art may recognize that many further combinations and permutations of the claimed subject matter are possible. Accordingly, the claimed subject matter is intended to embrace all such alterations, modifications, and variations that fall within the spirit and scope of the appended claims.

In particular and in regard to the various functions performed by the above described components, devices, circuits, systems and the like, the terms (including a reference to a "means") used to describe such components are intended to correspond, unless otherwise indicated, to any component which performs the specified function of the described component, e.g., a functional equivalent, even though not structurally equivalent to the disclosed structure, which performs the function in the herein illustrated exemplary aspects of the claimed subject matter. In this regard, it will also be recognized that the innovation includes a system as well as a computer-readable storage media having computer-executable instructions for performing the acts and events of the various methods of the claimed subject matter.

There are multiple ways of implementing the claimed subject matter, e.g., an appropriate API, tool kit, driver code, operating system, control, standalone or downloadable software object, etc., which enables applications and services to use the techniques described herein. The claimed subject matter contemplates the use from the standpoint of an API (or other software object), as well as from a software or hardware object that operates according to the techniques set forth herein. Thus, various implementations of the claimed subject matter described herein may have aspects that are wholly in hardware, partly in hardware and partly in software, as well as in software.

The aforementioned systems have been described with respect to interaction between several components. It can be appreciated that such systems and components can include those components or specified sub-components, some of the specified components or sub-components, and additional components, and according to various permutations and combinations of the foregoing. Sub-components can also be implemented as components communicatively coupled to other components rather than included within parent components (hierarchical).

Additionally, it can be noted that one or more components may be combined into a single component providing aggregate functionality or divided into several separate sub-components, and any one or more middle layers, such as a management layer, may be provided to communicatively couple to such sub-components in order to provide integrated functionality. Any components described herein may also interact with one or more other components not specifically described herein but generally known by those of skill in the art.

In addition, while a particular feature of the claimed subject matter may have been disclosed with respect to one of several implementations, such feature may be combined with one or more other features of the other implementations as may be desired and advantageous for any given or particular application. Furthermore, to the extent that the terms "includes," "including," "has." "contains." variants thereof, and other similar words are used in either the detailed description or the claims, these terms are intended to be inclusive in a manner similar to the term "comprising" as an open transition word without precluding any additional or other elements.

What is claimed is:

1. A first moving object that provides network connectivity, comprising:
   a first uplink device of the first moving object to connect the first moving object to a publicly available computer network;
   a first downlink device of the first moving object to be communicatively coupled to a remote device at a specific segment along a route of the first moving object, wherein the remote device is to provide data received via the first downlink device to a user;
   a cache store communicatively coupled to the first uplink device and the first downlink device; and
   a communications module to attempt to establish a handoff connection between the first moving object and a second moving object and, in response to establishing the handoff connection, migrate the routing of the data to and from the remote device to a second downlink device and a second uplink device on the second moving object from the first downlink device.

2. The first moving object of claim 1, wherein if the handoff connection is not established, the communications module is to store frequently requested internet content in the cache store and wait for the handoff connection to be established to provide the frequently requested internet content to the remote device via the second downlink device.

3. The first moving object of claim 1, the first moving object comprising an aircraft.

4. The first moving object of claim 1, the first moving object comprising an airplane.

5. The first moving object of claim 1, the specific segment based at least in part on a transmit power for the first downlink device.

6. The first moving object of claim 1, the first downlink device to use Automatic Dependent Surveillance-Broadcast (ADS-B) technology to route at least some of the data and at least some of the data is to be interleaved with other ADS-B communications.

7. The first moving object of claim 1, the first downlink device to use a portion of spectrum determined through dynamic spectrum access.

8. The first moving object of claim 1, the first uplink device and the first downlink device to use different portions of spectrum and the first uplink device to connect the first moving object to the computer network.

9. The first moving object of claim 1, the cache store to store data from the user after a connection with the first downlink device is lost, the stored data from the user to be sent to the second moving object through the second downlink device.

10. The first moving object of claim 1, the cache store comprising data received from the publicly available computer network.

11. The first moving object of claim 1, wherein the first moving object comprises an unmanned aerial vehicle.

12. One or more computer-readable storage devices for providing network connectivity via moving objects, comprising a plurality of instructions that, when executed by a processor, cause the processor to:
   determine an available spectrum via dynamic spectrum access;

establish a downlink to a remote device via a first downlink device of a first moving object using the available spectrum;

establish an uplink to a publicly available network via a first uplink device of the first moving object using a different portion of spectrum;

send and receive data to and from a remote device, the data to be relayed to and from the network via the first uplink device; and attempt to establish a handoff connection between the first moving object and a second moving object and, in response to establishing the handoff connection, migrate the routing of the data to and from the remote device to a second downlink device and a second uplink device on the second moving object from the first downlink device.

13. The one or more computer-readable storage devices of claim 12, wherein if the handoff connection is not established, the plurality of instructions cause the processor to store frequently requested internet content in a cache store, and wait for the handoff connection to be established to provide the frequently requested internet content to the remote device via the second downlink device.

14. The one or more computer-readable storage devices of claim 12, the first moving object comprising an aircraft.

15. The one or more computer-readable storage devices of claim 12, the first moving object comprising an airplane.

16. The one or more computer-readable storage devices of claim 12, further comprising a plurality of instructions that, when executed by a processor, cause the processor to steer a directional antenna of the first downlink device.

17. The one or more computer-readable storage devices of claim 12, further comprising a plurality of instructions that, when executed by a processor, cause the processor to interleave at least some of the data with ADS-B communications.

18. The one or more computer-readable storage devices of claim 12, wherein the first moving object comprises an unmanned aerial vehicle.

* * * * *